United States Patent
Brandsch et al.

(10) Patent No.: US 6,852,786 B2
(45) Date of Patent: Feb. 8, 2005

(54) RUBBER MIXTURE THAT CAN BE CROSS-LINKED BY SULFUR, METHOD FOR THE PRODUCTION THEREOF, AND CROSS-LINKED RUBBER MIXTURES AND SHAPED BODIES THAT CAN BE OBTAINED THEREFROM

(75) Inventors: Rainer Brandsch, Gilching (DE); Stefan Dick, Weichering (DE); Klaus Schurz, Munich (DE); Nikolaus Rennar, Unterpleichfeld (DE); Andreas Siedler, Leonberg (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 10/239,620

(22) PCT Filed: Mar. 8, 2001

(86) PCT No.: PCT/EP01/02638

§ 371 (c)(1),
(2), (4) Date: Jan. 3, 2003

(87) PCT Pub. No.: WO01/72884

PCT Pub. Date: Oct. 4, 2001

(65) Prior Publication Data

US 2004/0034159 A1 Feb. 19, 2004

(30) Foreign Application Priority Data

Mar. 24, 2000 (DE) .......................................... 100 14 664

(51) Int. Cl.$^7$ ................................................. C08L 3/34
(52) U.S. Cl. ....................... 524/445; 524/495; 525/342; 525/331.9; 525/332.5; 525/332.6; 525/333.1; 525/333.2; 525/333.3; 525/333.4
(58) Field of Search .................. 524/445, 267; 524/485, 492; 525/337.6

(56) References Cited

U.S. PATENT DOCUMENTS

| | | | |
|---|---|---|---|
| 3,692,816 A | | 9/1972 | Faille et al. |
| 4,026,966 A | * | 5/1977 | Baldwin et al. ............. 525/247 |
| 4,054,537 A | * | 10/1977 | Wright et al. ................ 423/331 |
| 4,233,366 A | | 11/1980 | Sample, Jr. et al. |
| 4,400,485 A | * | 8/1983 | Mukamal et al. ........... 524/444 |
| 4,431,755 A | | 2/1984 | Weber et al. ................ 523/203 |
| 4,522,970 A | * | 6/1985 | Scriver et al. .............. 524/447 |
| 4,810,734 A | | 3/1989 | Kawasumi et al. |
| 4,889,885 A | | 12/1989 | Usuki et al. |
| 5,137,998 A | | 8/1992 | Hsu et al. |
| 5,153,271 A | | 10/1992 | Lawson et al. |
| 5,162,409 A | | 11/1992 | Mroczkowski |
| 5,174,838 A | | 12/1992 | Sandstrom et al. |
| 5,227,425 A | | 7/1993 | Rauline |
| 5,227,431 A | | 7/1993 | Lawson et al. |
| 5,328,949 A | | 7/1994 | Sandstrom et al. |
| 5,333,662 A | * | 8/1994 | Costemalle et al. ........ 152/510 |
| 5,396,940 A | | 3/1995 | Segatta et al. |
| 5,414,185 A | * | 5/1995 | Salem et al. ................. 585/721 |
| 5,529,125 A | * | 6/1996 | Di Lullo Arias et al. ... 166/307 |
| 5,576,372 A | * | 11/1996 | Kresge et al. .............. 524/442 |
| 5,807,629 A | * | 9/1998 | Elspass et al. .............. 428/323 |
| 5,869,415 A | * | 2/1999 | Ortiz et al. ................... 502/81 |
| 5,871,846 A | * | 2/1999 | Freeman et al. ............ 428/405 |
| 5,883,173 A | * | 3/1999 | Elspass et al. .............. 524/446 |
| 5,908,500 A | * | 6/1999 | Brooks et al. .............. 106/486 |
| 6,034,164 A | * | 3/2000 | Elspass et al. .............. 524/445 |
| 6,080,809 A | | 6/2000 | Stuhldreher |
| 6,093,756 A | * | 7/2000 | Scholl ......................... 523/216 |
| 6,147,151 A | * | 11/2000 | Fukumoto et al. .......... 524/447 |
| 6,384,121 B1 | * | 5/2002 | Barbee et al. .............. 524/445 |
| 6,486,253 B1 | * | 11/2002 | Gilmer et al. .............. 524/445 |

FOREIGN PATENT DOCUMENTS

| | | | | |
|---|---|---|---|---|
| CN | 1013868 | | 7/1987 | |
| CN | 1013868 | * | 9/1991 | ............. C09C/1/42 |
| DE | 2727052 | * | 1/1979 | ........... C04B/33/04 |
| DE | 4308311 | | 9/1994 | |
| DE | 4415720 | | 11/1995 | |
| EP | 921150 | | 6/1999 | |
| GB | 1533262 | | 10/1975 | |
| JP | 7149954 | | 6/1995 | |
| JP | 9322807 | | 12/1997 | |
| WO | WO 94/22680 | | 4/1994 | |
| WO | WO 98/53000 A1 | * | 11/1998 | ............. C08K/3/34 |

OTHER PUBLICATIONS

Peng, Shuwen; Jiang, Cunxian; Lu, Jianchun in "Huagong Keji" (1998), 6 (2), 31–33 (Abstract).

* cited by examiner

*Primary Examiner*—David W. Wu
*Assistant Examiner*—Rip A. Lee
(74) *Attorney, Agent, or Firm*—Scott R. Cox

(57) ABSTRACT

A rubber compound is described containing as a reinforcing filler a layered silicate which is obtained by excessive leaching of a smectitic layered silicate with mineral acids. The rubber compound further contains at least one diene polymer or copolymer and a coupler containing groups reactive with the filler. There is also described a method for production of the rubber compound and molded articles produced from the rubber compound.

25 Claims, No Drawings

RUBBER MIXTURE THAT CAN BE CROSS-LINKED BY SULFUR, METHOD FOR THE PRODUCTION THEREOF, AND CROSS-LINKED RUBBER MIXTURES AND SHAPED BODIES THAT CAN BE OBTAINED THEREFROM

The invention concerns a rubber compound, cross-linkable with sulfur, a method for its production, as well as the cross-linked rubber compounds and molded articles obtainable from it.

Modern truck and automobile tires represent technically mature, high-performance composites that consist of several individual components with different physical properties and different mixture formulas. Regardless of this complexity, a modern pneumatic tire must satisfy different, often contradictory requirements in the system "wheel/tire-roadway", among which the lowest possible rolling resistance, high wet-skid resistance and high wear resistance can be mentioned as the most important features.

In principle, it can be assumed that during rolling of the tire and during the braking process, in particular, dynamic deformation processes that occur with very different excitation frequencies are induced in the tread. However, owing to the frequency-temperature correspondence principle, temperature ranges of the mechanical loss factor tan δ can be assigned approximately to the high-frequency deformation processes relevant for wet gripping and the low-frequency deformation processes relevant for rolling resistance. The wet-skid resistance can be improved, for example, by a rise in the loss factor in the temperature range from −20 to −5° C. and an excitation frequency of about 10 Hz. On the other hand, the rolling resistance can be improved by a reduction in loss factor in the temperature range from 50 to 65° C., also at about 10 Hz.

The solution to this problem, however, is hampered by the fact that the mentioned tire properties do not depend merely on material characteristics, but also on material-independent parameters, like internal air pressure, tire design, tire weight, tread profile, roadway roughness, etc.

It is little wonder that, despite considerable effort, it has still not been possible to reconcile all three tire properties of the above "magic triangle of tire technology" to the maximum attainable level independently of each other, since two of the three main properties appear to be coupled to each other in reciprocal fashion.

The properties of a vulcanizate depend primarily on the micro- and macrostructure of the network chains forming the polymer network. The vulcanization properties, however, are also quite decisively influenced by the structure of the network, which is dependent, among other things, on the type of cross-linking, the cross-link density and the type, amount and dispersion of the added filler and plasticizer, since technologically interesting properties, in many cases, can only be achieved by addition of such additives.

Ordinarily, large amounts of active blacks are added to rubber compounds to improve the strength and wear resistance. However, owing to filler-filler interaction, this unfortunately leads to an undesired energy dissipation of the dynamically stressed vulcanizates in a frequency range relevant for rolling resistance and therefore to an increase in mechanical damping, which ultimately shows up in increased fuel consumption.

Different approaches to optimized tire properties have been proposed:

The use of trans-1,4-polybutadiene rubber (trans-BR) in the base compound of a tire tread is recommended in EP 0 505 904 A1. The use of styrene-isoprene-butadiene tertpolymers in the tire tread, according to U.S. Pat. No. 5,137,998 A, is another possibility of improving tire properties by choosing appropriate rubbers. Coupling of anionically polymerized diene-(co-)-polymers and end stopping with substituted imines or aromatic nitriles has also been proposed in EP 510 410 A1 and U.S. Pat. No. 5,153,271, as well as addition of halogenated butyl rubber to SBR/BR rubber compounds filled with silica in U.S. Pat. No. 5,162,409.

A (partial) substitution of carbon black with a special silica combined with a special solution-SBR, proposed according to EP 0 501 227 A1, yielded a significant reduction in rolling resistance and an improvement in skid resistance with acceptable wear resistance. However, in order to achieve this potential, the addition of special reinforcement additives and precise maintenance of special mixing specifications are essential, which ultimately leads to increased mixing costs. The saving of the reinforcement additive, on the other hand, generally leads to a series of drawbacks of the silica-containing compounds or vulcanizates, in comparison with carbon black compounds or vulcanizates, respectively. In particular, the following occurred:

high mixing viscosity and high die swell, difficult dispersion of the polar silicas in non-polar rubbers, limited rubber-filler interaction, and hampering of accelerated sulfur vulcanization and the resulting relatively low cross-link densities.

U.S. Pat. No. 5,328,949 describes rubber compounds containing elastomers, silica, optionally carbon black, and a silica coupler composed of dithiodipropionic acid. Pyrogenic silica or precipitated silica can be used as silica, the latter being preferred. The coupler has the task of reinforcing the intrinsically weak chemical bond between the silica particles and the elastomers. Use of dithiodipropionic acid, however, has the drawback that the bonding of the silica particles to the elastomers is too weak.

A rubber compound for treads of vehicle tires is known from EP 0 921 150 A1 that represents a mixture of special rubbers reinforced with silica and carbon black. The wet-skid behavior is supposed to be improved with this combination material. The silicas known from the prior art with a BET surface area of 145 to 270 m$^2$/g and a CTAB surface area of 120 to 285 m$^2$/g are supposed to be used as silicas, for example, the commercial product VN3 from the Degussa company. This is a precipitated silica. The drawbacks of this rubber compound are that its processing properties are unsatisfactory, the vulcanized compounds have low aging resistance and the rolling resistance of tires produced from it is relatively high.

It is known from the paper of Peng, Shuwen; Jiang, Cunxian; Lu, Jianchun in "Huagong Keji" (1998), 6 (2), 31–33 that, when about 5 to 10% modified bentonite is added to the inner and middle part of the tire, the mechanical properties of the vulcanizate are not adversely affected, but the processing properties of the rubber compound are modified and the cohesion forces between the frame and the rubber mass are improved. However, no information is found concerning the type, structure and physical-chemical properties of the modified bentonite or the composition of the rubber compound.

CN 1 013 868 B describes a method catalyzed by fluoride ions for acid activation of sepiolite and swellable clay, using sulfuric acid, hydrochloric acid and nitric acid. The acid-activated product can be used as a reinforcing filler for rubber and other polymers. The price of the product is supposed to be lower than that of the precipitated silica employed in the rubber industry. There is no information concerning the type of rubber polymer and its bonding to the reinforcing filler.

In fact, the products according to CN 1 013 868 B yield more unfavorable properties, in comparison with the standard silicas. This is shown, for example, in a more limited cross-link density of the claimed silica gels, documented by a smaller torque difference ($D-D_0$) in the vulcameter experiment. The tire elongation and the tensile strength of the stressed vulcanizates are also lower, in comparison with vulcanizates filled with silica.

Organoclays that contain tetrahedral and octahedral layers of a phyllosilicate are known from GB 1,326,907 A, in which at least some of the metal atoms from the octahedral layer are replaced by organic groups with at least one olefinic double bond, and in which at least one silicon atom is bonded to a silicon atom of the tetrahedral layer via an Si—O—Si siloxane bond. These organoclays are produced by acid hydrolysis of a phyllosilicate, in which at least some of the metal atoms are removed from the octahedral layer. Examples of phyllosilicates include mica, vermiculite, chrysotile or sepiolite. These phyllosilicates are not swellable.

The organoclays are used as reinforcing fillers in rubber compounds cross-linkable with sulfur (styrene-butadiene or ethylene-propylene rubber).

Production of organic phyllosilicates, especially chrysotile asbestos, is described in U.S. Pat. No. 4,233,366 A and in GB 1,533,262 A, in which the chrysotile asbestos is treated with a dilute acid, in order to dissolve out metal oxides, like magnesium oxide, from the near-surface octahedral layers, whereupon the chrysotile asbestos so treated is treated with an organosilane. By mild acid treatment, a situation in which amorphous silica remains behind is supposed to be avoided. Swellable smectitic layer silicates are not used as phyllosilicates. The organophilic substances are used as rheological additives and reinforcing fillers, also for rubber compounds. The condition of the filler and its tire properties are not described.

Rubber compounds containing diene polymers, finely divided clays as fillers and a silane coupler are described in JP 07-149954 A, JP 08-085738 A and JP 09-322807 A. Kaolinite is primarily used as filler. Acid-activated smectitic layer silicates are not mentioned. Composites, consisting of polymers and layer silicates dispersed in them, are known from U.S. Pat. Nos. 4,810,734 A and 4,889,885 A, in which layer silicates with an ion exchange capacity from 50 to 200 meq/100 g are treated with a swelling agent, in order to replace the interlayer cations with organic onium ions. The obtained complex has a defined layer spacing and is therefore not x-ray amorphous; the organic fraction is 10 to 30 wt. %. The organic onium ions are bonded to the negatively charged layers of the layer silicate via the positive charge and can be incorporated in a polymer by means of a second functionality. Acid-activated smectitic layer silicates are not used as fillers.

WO 94/22680 concerns a similar object, according to which a rubber complex consists of a reactive rubber with a positively charged group and a layer silicate uniformly distributed in it, whose layer spacing is greater than 10 Å. The reactive rubber contains an onium salt or an onium salt precursor. The filler is therefore not an acid-activated smectitic layer silicate.

DE 43 08 311 A, 44 15 720 A and 198 02 698 A describe rubber compounds that contain, among other things, finely distributed precipitated silica or silicate fillers. The precipitated silica can be hydrophobized with a plasticizer. A sulfur-containing silane or an epoxidized natural rubber can be used as coupler. Precipitated silica or silicate fillers are not produced by acid treatment of a swellable layer silicate. They generally have a spherical structure.

A rubber compound vulcanized with sulfur that contains epoxidized rubber, a filler based on silica (pyrogenic silica or precipitated silica) and a coupler is known from U.S. Pat. No. 5,396,940. The rubber is a diene polymer or copolymer. Acid-activated layer silicates are not mentioned as fillers.

The main task of the present invention is to develop a low-damping elastomer system suitable, among other things, for production of tire components and technical rubber articles, like vibration dampers. In particular, tires produced from this mixture, in comparison with silica-containing and carbon black-filled systems, are supposed to exhibit a significant reduction in rolling resistance and therefore a reduction in gasoline consumption and the accompanying $CO_2$ emission. However, at the same time, an improvement in wet-skid resistance with acceptable strength values is also to be obtained. Only slight changes in vulcanizate properties with progressive oxygen aging at elevated temperatures and more uniform rubber wear were additional requirements to be met by the present invention. The mixture according to the invention should also exhibit limited die swell, low gas permeability, good co-vulcanizability with other diene rubbers, no reversion and no "marching modulus", and therefore also be usable in thick-walled components. More cost-effective production of the rubber article, based on the use of cheaper raw materials and/or reduced mixing costs relative to conventional solutions, were also sought.

It has now surprisingly been found that the use of finely divided acid-activated smectitic layer silicates, in conjunction with certain rubber-like polymers and couplers, leads to broadening of the mechanical damping curve in the high-frequency deformation range and a reduction in the absolute values of the loss factor in the low-frequency deformation range.

One object of the invention is therefore a rubber compound, cross-linkable with sulfur, containing (a) at least one diene polymer or copolymer;

(b) at least one finely divided, acid-activated layer silicate derived from a smectitic layer silicate as a reinforcing filler; and (c) at least one coupler with reactive groups relative to filler (b);

The object additionally is a rubber compound cross-linked with sulfur that can be obtained from the cross-linkable rubber compound listed above by vulcanization at temperatures of more than about 100° C.

DETAILED DESCRIPTION OF THE INVENTION

The silane (c2) preferably contains, as reactive group, at least one functional group —$S_x$—, in which x is an integer from 2 to 6. Examples of such silanes are bis-(trialkoxysilylalkyl)polysulfanes or their condensation products with themselves or with other sulfur-containing or non-sulfur-containing silanes. Representatives of the sulfur-containing organosilanes are 3,3'-bis-(triethoxysilylpropyl) tetrasulfane or its condensation products with itself or with 3-mercaptopropyltrimethoxysilane or propyltriethoxysilane.

A cross-linked rubber compound, on the one hand, exhibits both a broadening and increase in the absolute values of the mechanical damping curve in the high-frequency deformation range and, on the other hand, a reduction of the absolute values of the loss factor in the low-frequency deformation range. An improvement in both wet-skid resistance and rolling resistance results with acceptable strength values, since the filler particles are bonded to the rubber matrix by main valence bonding. This is demonstrated, for example, by the fact that, already during heating of the rubber base compound (without cross-linking chemicals), an exothermic reaction occurs and, after solvent treatment of the unvulcanized compound, the percentage of rubber bonded to the filler (bound rubber) is higher. Extensive rubber processing tests demonstrated that the rubber compound according to the invention and the vulcanizate produced from it are, in fact, superior to silica-containing and carbon black-filled elastomer systems of the prior art.

The diene polymer or copolymer (a) preferably contains no epoxy groups, and the coupler (c) represents at least one diene polymer or copolymer with functional epoxy groups (c1) and/or a silane (c2) with at least one additional group reactive with the diene polymer or copolymer (a).

The weight ratio between the coupler (c1) and the coupler (c2) is preferably about 1 to 5:1, especially about 3:1.

The diene polymer (a1) preferably represents a rubber and the diene copolymer (a2) a copolymer of a conjugated diene and an aromatic vinyl compound and/or a mono-olefinic aliphatic monomer.

The rubber compound according to the invention contains about 5 to 150 parts by weight reinforcing filler per 100 parts by weight total diene polymer or copolymer (a+c1).

The finely divided, acid-activated layer silicate is derived from a smectitic layer silicate. The finely divided, acid-activated smectitic layer silicate preferably has a specific BET surface area of about 80 to 250 $m^2/g$, especially about 80 to 230 $m^2/g$, a CTAB surface area of about 80 to 220 $m^2/g$, an average particle diameter of about 0.4 to 10 $\mu$m, a pore volume of about 0.1 to 2 mL/g and an $SiO_2$ content of about 60 to 98%, especially about 80 to 98%. Its layer structure (plate-like morphology) is still largely retained.

The acid-activated smectitic layer silicate is preferably obtained using an acid mixture containing fluoride ions.

Use of fluoride ions in catalytically active amounts causes an increase in pore volume and CTAB surface area. The small pores therefore become larger, which is an advantage to the extent that the large rubber molecules can penetrate more readily into the pores, so that better bonding between the filler and the polymer is produced. The fluoride ions react with the

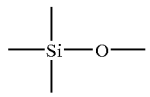

groups in the layer silicate, in which $H_2SiF_6$ is formed, which again hydrolyzes to HF and $(SiO_2)_{aq}$. The formed HF then reacts again with the

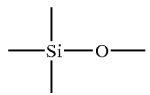

groups in the layer silicate, so that the fluoride ions in a way act catalytically. For example, it is sufficient if the amount of fluoride ions in the acid mixture is only about 1 to 5%. The digestion time is also shortened by the addition of fluoride ions.

The following smectitic layer silicates can be used as starting materials for acid activation: montmorillonite (main mineral of bentonite), beidellite, hectorite, saponite, nontronite and their mixtures. These smectitic layer silicates have a mica-like three-layer structure with two tetrahedral layers and an octahedral layer in between. The exchangeable interlayer cations (lithium, sodium, potassium, magnesium and/or calcium) lie between the negatively charged silicate layers. Cation exchange capacity and a capacity for inner crystalline swelling are characteristic of most of the minerals of this group.

During acid activation, the layer silicates are preferably treated with mineral acids (for example, hydrochloric acid or sulfuric acid with a small amount of hydrofluoric acid). The exchangeable interlayer cations are initially replaced by protons. Then, depending on the reaction conditions (acid concentration, temperature, pressure and time), the octahedral layer ions (magnesium, aluminum, and iron) are partially or fully dissolved out, so that x-ray-amorphous products, chiefly amorphous silica, are finally obtained from the layer silicate. The silicate layers are partly retained if acid attack is not too strong. The layer packets, and also individual silicate layers, are shifted and disoriented relative to each other by the voluminous silica formed in the edge zones. With increasing acid concentration, the specific surface area, micropore volumes and the amount of $Al_2O_3$ and $Fe_2O_3$ dissolved out from the lattice increase. At the same time, the content of free silica soluble in dilute soda solution increases. The strong porosity of the edge zones of the acid-activated smectitic layer silicates is conspicuous in an electron microscope.

Even if x-ray amorphous silica is formed during strong acid attack, this has a different structure than precipitated silica, i.e., the layer structure and the plate-like morphology connected with it is still largely retained.

The specific BET surface area is increased by acid activation to about 80 to 250 $m^2/g$, especially to about 230 $m^2/g$. The BET surface area is determined according to the nitrogen adsorption method according to DIN 66131. During strong acid activation, the BET surface area diminishes somewhat again, but generally does not fall below 150 $m^2/g$. The CTAB surface area also increases to about 80 to 220 $m^2/g$. This is determined according to ISO 6810. The specific pore volume also increases to about 0.1 to 2 mL/g. The specific pore volume is determined by adsorption of nitrogen. The filler is cooled in high vacuum to liquid nitrogen temperature, and nitrogen is continuously supplied. The adsorbed amount of gas, as a function of pressure at constant temperature, yields the adsorption isotherm. After pressure equalization, the nitrogen is desorbed in steps and the desorption isotherms are obtained. Determination of the specific pore volume occurs by evaluating the adsorption and desorption isotherms by means of "density function" theory (DFT).

If magnesium, aluminum and iron ions are dissolved out from the lattice during acid activation, the $SiO_2$ content is increased accordingly. The acid-activated smectitic layer silicate employed according to the invention preferably has an $SiO_2$ content of about 60 to 98%, especially about 80 to 98%. The $SiO_2$ content is determined according to DIN 55921. The average particle diameter of the acid-activated smectitic layer silicate is about 0.4 to 10 $\mu$m.

Determination of the particle size distribution of the fillers was performed with a laser particle size analyzer. For this purpose, a sample of about 50 mg was mixed with about 10 mL ethanol in a 20 mL beaker and treated for 5 minutes with an ultrasonic finger. The ethanol suspension is transferred to the dispersal unit of the instrument and ethanol added until the correct concentration is set on the measurement instrument, and then measured.

The difference between the acid-activated smectitic layer silicate and precipitated silica is also significant at a high $SiO_2$ content. The acid-activated layer silicates according to the invention also exhibit a plate-like morphology under a scanning electron microscope with high $SiO_2$ content, in which the morphology of the initial material is preserved. In contrast, the precipitated silica exhibits grape-like aggregates of spherical primary particles under the scanning electron microscope. The agglomerates/aggregates, during incorporation of the filler in a rubber compound, tend toward partial disintegration into smaller structural units, which leads to a sharp increase in viscosity and therefore a deterioration in processing properties.

"Ullmann's Encyclopädie des Techmischen Chemie", 4$^{th}$ Edition, 1983, Volume 23, pages 311 to 326, is referred to for the composition and properties of acid-activated smectitic layer silicates.

According to one preferred embodiment of the invention, the finely divided, acid-activated layer silicate (b) or part of it is present as a master batch mixture with coupler (c1), in which about 50 to 150 parts by weight of acid-activated layer silicate per 100 parts by weight coupler are obtained.

The rubber compound according to the invention can also contain finely divided precipitated silica, in addition to the finely divided, acid-activated layer silicate (b), in which the weight fraction of finely divided, acid-activated layer silicate is about 20 to 100%, preferably about 40 to 100%, referred to the total reinforcing filler.

It was surprisingly found that the advantages according to the invention also appear when the fraction of acid-activated layer silicate (b) is relatively small, in comparison with the fraction of precipitated silica, since the first mentioned filler, because of its plate-like morphology, enters into stronger interaction with the diene polymer or copolymer than the last-named filler. Other amorphous silicas, for example, pyrogenic silica or silica xerogel, can also be used instead of precipitated silica.

The diene polymers or copolymers (a) are preferably chosen from natural rubber, synthetic polyisoprene, polybutadiene, isoprene-butadiene copolymers, ethylene-propylene-diene terpolymers (EPDM), copolymers of aromatic vinyl compounds and conjugated dienes, as well as copolymers of mono-olefinic monomers and conjugated dienes.

The diene polymer or copolymer (a) preferably has a degree of epoxidation of about 10 to 60 mol % and a glass transition temperature ($T_g$) of −60 to −10° C.; its fraction in the mixture is about 5 to 50 parts by weight, referred to 100 parts by weight total polymer or copolymer (a+c1).

The copolymer (a2), produced from an aromatic vinyl compound and conjugated diene, preferably by solution polymerization, preferably has a percentage of aromatic vinyl compound of about 5 to 40 wt. %, referred to the copolymer; the glass transition temperatures of the copolymer constructed from an aromatic vinyl compound and conjugated diene, as well as a mono-olefinic aliphatic monomer and conjugated diene, preferably vary between $T_g$=−70 and −10° C.

The aromatic vinyl compound is preferably chosen from styrene, α-methylstyrene, p-methylstyrene, o-methylstyrene, vinylnaphthalene or their mixtures; the mono-olefinic, aliphatic monomer is preferably chosen from acrylonitrile, methacrylonitrile or mixtures of them, and the conjugated diene is preferably chosen from 1,3-butadiene, 2-methyl-1,3-butadiene, 2,3-dimethyl-1,3-butadiene, 2-chloro-1,3-butadiene, 1,3-pentadiene or their mixtures.

An object of the invention is also a method for production of the cross-linkable rubber compounds just described, comprising the following steps:

(i) Mixing of the diene polymer or copolymer (a) and the reinforcing filler (b) with the coupler (c) and/or optionally with a master batch mixture of filler (b) with coupler (c1), and optionally with other usual additives, except for vulcanization chemicals, using ordinary mixing equipment at about 105 to 150° C.;

(ii) Mixing of the vulcanization chemicals at a temperature of less than about 100° C.

The usual vulcanization chemicals, like sulfur or sulfur donors (compounds that contain a chain of sulfur atoms that are saturated by terminal organic groups), are used.

The employed mixing equipment is used not only to disperse the mixture components, but also functions, in a certain sense, as a chemical reactor.

The following mixing equipment can be used, for example: closed mixers with touching or intermeshing kneading blades; closed mixers without or with an adjustable kneading blade system; rolling mills, consisting of two rolls mounted next to each other, generally horizontally, with adjustable roll gap, adjustable speed and adjustable temperature control.

The object of the invention is also a rubber compound, cross-linkable with sulfur that can be obtained from a rubber compound, cross-linkable with sulfur, by vulcanization at temperatures of more than about 100° C., especially about 160 to 180° C.

Finally, molded articles, especially vehicle tires or their parts, rubber bearings, conveyor belts, hoses and sealing elements that can be obtained from the cross-linkable or cross-linked rubber compounds are objects of the invention.

The invention is explained by the following examples, but without being restricted to them.

EXAMPLE 1

Production of the Fillers A, B, C and D According to the Invention:

A) 50 kg bentonite crude clay (35 kg abs. dry) was suspended with 66 kg water, filtered through a 1 mm sieve and purified with a cyclone. The resulting suspension was boiled with 5.55 kg technical HCl (29%) and 0.45 kg water for 16 hours with agitation. After cooling to 70° C., it was filtered on a filter press and washed with deionized water, until the electrical conductivity of the filtrate had diminished to that of the wash water. The filter product was then dried overnight at 170° C., ground and screened.

B) 50 kg bentonite crude clay (35 kg abs dry) was suspended with 66 kg water, filtered through a 1 mm sieve and purified with a cyclone. The resulting suspension was boiled with agitation for 72 hours with 71.2 kg technical HCl (31%). After cooling to 70° C., it was filtered on a filter press and washed with deionized water, until the electrical conductivity of the filtrate had diminished to that of the wash water. The filter product was then dried overnight at 170° C., ground and screened.

C) 50 kg bentonite crude clay (35 kg abs dry) was suspended with 66 kg water, filtered through a 1 mm sieve and purified with a cyclone. The suspension was boiled with agitation for 16 hours with 57.0 kg technical HCl (31%) and 1.38 kg HF (48%). After cooling to 70° C., it was filtered on a filter press and washed with deionized water, until the electrical conductivity of the filtrate had diminished to that of the wash water. The filter product was then dried overnight at 170° C., ground and screened.

D) 50 kg bentonite crude clay (35 kg abs dry) was suspended with 66 kg water, filtered through a 1 mm sieve and purified with a cyclone. The suspension was boiled with agitation for 72 hours with 57.0 kg technical HCl (31%)

and 0.3 kg HF (48%). After cooling to 70° C., it was filtered on a filter press and washed with deionized water, until the electrical conductivity of the filtrate had diminished to that of the wash water. The filter product was then dried overnight at 170° C., ground and screened.

As comparison substance, a commercial precipitated silica was used (Ultrasil® VN3; manufactured by Degussa). The chemical and physical properties of the fillers A, B, C and D according to the invention, as well as the precipitated silica, are shown in Table I.

TABLE I

| Characteristic | Ultrasil VN3 (Reference) | Filler A | Filler B | Filler C | Filler D |
|---|---|---|---|---|---|
| BET surface (m²/g) | 178 | 159 | 205 | 142 | 175 |
| CTAB surface (m²/g) | 178 | not determined | 90 | 98 | 137 |
| BET/CTAB ratio | 1.0 | not determined | 2.28 | 1.45 | 1.28 |
| Particle Size $D_{50}$ (μm) | 4.2 | 2.9 | 7.6 | 6.9 | 7.1 |
| Particle Size $D_{90}$ (μm) | 12.5 | 5.1 | 23.9 | 17.3 | 18.7 |
| $D_{90}:D_{50}$ | 2.98 | 1.76 | 3.14 | 2.51 | 2.63 |
| Specific Pore Volume (mL/g) | 1.25 | 0.22 | 0.75 | 0.57 | 0.88 |
| Filler-specific constant $\alpha_F$ | 1.85 | 1.03 | 1.59 | — | — |
| Filler-specific constant A | 35.2 | 21.4 | 30.8 | — | — |
| $\alpha_F \cdot A$ | 65.1 | 22.1 | 48.9 | — | — |
| $SiO_2$ content (%) | 93.5 | 64.5 | 93.2 | 95.3 | 95.1 |
| $Al_2O_3$ content (%) | 0.2 | 16.2 | 1.2 | 0.18 | 0.25 |
| $Fe_2O_3$ content (%) | 0.03 | 1.5 | 0.15 | 0.05 | 0.07 |
| LOI (1100° C.) (%) | 4.5 | 6.7 | 4.7 | 4.2 | 4.3 |

The filler-specific constant $\alpha_F$ and the filler-specific constant A refer to natural rubber (NR)/styrene-butadiene-rubber (SBR) compound (15/85) and are accessible from vulcameter and rebound elasticity measurements. The vulcameter measurements were conducted according to DIN 53529 and the rebound elasticity measurements according to DIN 53512.

EXAMPLES 2 AND 3

The fillers mentioned in example 1 were incorporated in different rubber compounds (M1, M2, M3), whose composition is shown in the following Tables IIa and IIb.

TABLE IIa

| Formula Component | Compound M1 | | | Compound M2 | | | |
|---|---|---|---|---|---|---|---|
| | M1-1 | M1-2 | M1-3 | M2-1 | M2-2 | M2-3 | M2-4 |
| ENR-50 | 10 | 10 | 10 | 15 | 15 | 15 | 15 |
| VSL 2525-0 | 60 | 60 | 60 | 60 | 60 | 60 | 60 |
| VSL 5025-1 | 41.25 | 41.25 | 41.25 | 34.4 | 34.4 | 34.4 | 70 |
| Carbon Black N 339 | — | — | — | — | — | — | — |
| Ultrasil VN 3 | 68 | — | 34 | 70 | — | — | — |
| Filler B | — | 68 | 34 | — | 70 | — | — |
| Filler C | — | — | — | — | — | 70 | — |
| X50-S | 10.2 | 10.2 | 10.2 | 9.5 | 9.5 | 9.5 | — |
| Σ aromatic oil | 18 | 18 | 18 | 21.9 | 21.9 | 21.9 | 34.4 |
| 6PPD | 1.5 | 1.5 | 1.5 | 1.5 | 1.5 | 1.5 | 1.5 |
| TMQ | 0.5 | 0.5 | 0.5 | 0.5 | 0.5 | 0.5 | 0.5 |
| Light Protection Wax | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 |
| Stearic Acid | 2.0 | 2.0 | 2.0 | 2.0 | 2.0 | 2.0 | 2.0 |
| Sulfur | 1.8 | 1.8 | 1.8 | 1.8 | 1.8 | 1.8 | 1.8 |
| CBS | 1.5 | 1.5 | 1.5 | 1.5 | 1.5 | 1.5 | 1.5 |
| DPG | 2.0 | 2.0 | 2.0 | 2.0 | 2.0 | 2.0 | 0.3 |

TABLE IIb

| Formula Component | Compound M3 | | | | |
|---|---|---|---|---|---|
| | M3-1 | M3-2 | M3-3 | M3-4 | M3-5 |
| ENR-50 | 15 | 15 | 15 | 15 | 15 |
| VSL 2525-0 | 58.8 | 58.8 | 58.8 | 58.8 | 58.8 |
| VSL 5025-1 | 36 | 36 | 36 | 36 | 36 |
| Ultrasil VN 3 | 65 | — | — | — | — |
| Filler A | — | 65 | — | — | — |
| Filler B | — | — | 65 | — | — |
| Filler C | — | — | — | 65 | — |
| Filler D | — | — | — | — | 65 |
| X50-S | 10.2 | 10.2 | 10.2 | 10.2 | 10.2 |
| Σ aromatic oil | 27.5 | 27.5 | 27.5 | 27.5 | 27.5 |
| 6PPD | 1.5 | 1.5 | 1.5 | 1.5 | 1.5 |
| TMQ | 0.5 | 0.5 | 0.5 | 0.5 | 0.5 |
| Light Protection Wax | 1.5 | 1.5 | 1.5 | 1.5 | 1.5 |
| ZnO | 3.0 | 3.0 | 3.0 | 3.0 | 3.0 |
| Stearic Acid | 2.0 | 2.0 | 2.0 | 2.0 | 2.0 |
| Sulfur | 1.8 | 1.8 | 1.8 | 1.8 | 1.8 |
| CBS | 1.5 | 1.5 | 1.5 | 1.5 | 1.5 |
| DPG | 2.0 | 2.0 | 2.0 | 2.0 | 2.0 |

Comments concerning Tables IIa and IIb: the following raw materials were used to produce the rubber compounds:

Expoxyprene 50 (epoxidized natural rubber ENR-50) commercial product of Guthrie Sdn., Bhd.

Buna VSL 2525-0 (oil-free S-SBR), BUNA VSL-5025-1 (oil-extended S-SBR): commercial products of Bayer AG;

Corax N 339 (carbon black N 339): commercial product of Degussa AG;

Ultrasil VN3 (precipitated silica): commercial product of Degussa AG;

X50-S: bis-(triethoxysilylpropyl)tetrasulfane; commercial product Si69 of Degussa-Hüls AG in a 1:1 mixture with precipitated silica Ultrasil VN 3, mixed in a 1:1 ratio with Corax N 330; reinforcement additive of Degussa-Hüls AG;

6PPD: N-(1,3-dimethylbutyl)-N'-phenyl-p-phenylenediamine

TMQ: 2,2,4-trimethyl-1,2-dihydroquinoline, polymerized

ZnO: Zinc oxide

CBS: N-cyclohexyl-2-benzothiazolyl-sulfenamide

DPG: N,N'-diphenylguanidine

Production of the base compound occurred by mixing the rubber materials, the filler components and the other additives, except for the vulcanization system, using ordinary mixing equipment with simultaneous heating of the rubber compounds with temperature between 105 and 160° C. Production of the finished compounds occurred by mixing in the vulcanization chemicals (cross-linking chemicals), like sulfur or sulfur donors, accelerator, optionally retarders, at a temperature below about 100° C.

The finished compounds were then pressed to plates of different thickness (1–10 mm) and final vulcanize at a temperature of 160° C. Test specimens were then punched out from the vulcanizated plates, which were tested for the following properties:

Shore hardness according to DIN 53505; rebound elasticity according to DIN 53512; determination of tensile strength and strain at break according to DIN 53504; mechanical loss factor tan δ at different temperatures according to DIN 53513 and DIN 53535, by means of a dynamic-mechanical analyzer (Eplexor); gas permeability at different temperatures according to DIN 53536. The dimensions of the test specimens, their conditioning and the corresponding test procedures are described in detail in the mentioned test specifications.

The results are shown in Tables IIIa and IIIb.

swell and lower time dependence, especially at high shear gradient, as occur during extrusion and calendering of production compounds.

The following is apparent from Table IIIa:

The vulcanizates filled with the fillers according to the invention, both in the compound M1 and compound M2, exhibit significant advantages in wet-skid resistance and in rolling resistance, in comparison with vulcanizates according to the prior art that were filled with a commercial precipitated silica filler.

A vulcanizate filled with carbon black (M2–4), on the other hand, exhibits distinct shortcomings in both tire properties.

TABLE IIIa

Vulcanizate properties of model compounds

| Tread Property | Material Characteristic | Compound M1 | | | Compound M2 | | | |
|---|---|---|---|---|---|---|---|---|
| | | M1-1 (Ultrasil VN3) | M1-2 (Filler B) | M1-3 (Filler B-VN3 Blend) | M2-1 (Ultrasil VN3) | M2-2 (Filler B) | M2-3 (Filler C) | M2-4 (Carbon Black N339) |
| | Shore-Hardness | 65 ShA | 70 ShA | 68 ShA | 63 ShA | 63 ShA | 62 ShA | 61 ShA |
| Wet-skid resistance (rating[1]) | Loss factor tan δ (273 K, 10 Hz, 10% static deformation, 0.2% dynamic deformation) | 100 | 104.1 | 112.3 | 100 | 105.8 | 103.1 | 96.6 |
| | Friction coefficient (BPST)[2] | 100 | 102.4 | — | — | — | — | — |
| Rolling Resistance (rating[1]) | Loss Factor tan δ (333 K, 10 Hz, 10% static deformation, 3% dynamic deformation) | 100 | 118.9 | 105.2 | 100 | 106.0 | 144.7 | 52.4 |
| | Rebound Elasticity (343 K) | 100 | 100.7 | 100.4 | 100 | 108.8 | 114.6 | 71.5 |

[1]Improvement means: values greater than 100
[2]British portable skid tester

TABLE IIIb

Vulcanizate and compound data of model compounds

| | Compound M3 | | | | |
|---|---|---|---|---|---|
| Material Characteristic | M3-1 | M3-2 | M3-3 | M3-4 | M3-5 |
| Shore Hardness (ShA) | 52.2 | 43.0 | 50.3 | 52.5 | 53.9 |
| $\sigma_{100}$ (Mpa) | 1.85 | 1.17 | 3.17 | 3.25 | 3.5 |
| Rebound Elasticity (%) | 60.5 | 55.7 | 61.1 | 63.4 | 65.2 |
| $t_{oil}/m_{oil}$ (s/g) | 1.13 | 0.36 | 0.34 | 0.32 | 0.31 |

Comparative data on fillers A to D and Ultrasil VN3 are found in Tables IIb and IIIb.

The more favorable processing properties of the rubber compound according to the invention, in comparison with compounds with ordinary silica, are found, for example, in the time change of die swell during extrusion of a rubber compound through a nozzle with a diameter of 1 mm. The compound according to the invention with a filler according to the invention exhibits much lower absolute values of die

What is claimed is:

1. A rubber compound, crosslinkable with sulfur comprising
   (a) at least one diene polymer or copolymer;
   (b) a reinforcing filler surprising a finely divided, acid-activated layered silicate derived from at least one smectitic layered silicate; and
   (c) a coupler containing groups reactive with the filler; wherein the acid-activated layered silicate has a specific BET surface area of about 80 to about 250 m²/g, an average particle diameter of about 0.4 to 10 μm, a pore volume of about 0.1 to 2 mL/g and an $SiO_2$ content of about 60 to 98 percent.

2. The rubber compound of claim 1, wherein the diene polymer or copolymer (a) contains no epoxy groups, and wherein the coupler (c) comprises a material selected from the group consisting of (i) a diene polymer or copolymer coupler containing at least one functional epoxy group, (ii) a silane with an additional group reactive with the diene polymer or copolymer of component (a), and (iii) mixtures thereof.

3. The rubber compound according of claim 2, wherein the silane material (ii) contains as a reactive group at least one functional group of the form —$S_x$—, wherein x is an whole number from 2 to 6.

4. The rubber compound of claim 2, wherein the coupler (c) comprises a mixture of the diene polymer or copolymer (i) and the silane (ii) in a weight ratio of about 1:1 to about 5:1.

5. The rubber compound of claim 4, wherein the weight ratio of the filler (b) to the diene polymer or copolymer of components (a) and (c) is from about 0.05 to 1 to about 1.5 to 1.

6. The rubber compound of claim 2, wherein the coupler (c) comprises a mixture of the diene polymer or copolymer (i) and the silane (ii) in a weight ratio of about 1:1 to about 3:1.

7. The rubber compound of claim 6, wherein the diene polymer or copolymer coupler of component (c) has a degree of epoxidation from about 10 to about 60 mol percent, a glass transition temperature ($T_g$) of from −60 to −10° C., and comprises from about 5 to about 50 percent by weight of total polymers or copolymers present in component (a) and component (c) combined.

8. The rubber compound of claim 1, wherein the diene polymer of component (a) comprises a natural rubber and the diene copolymer of component (a) comprises a copolymer of a conjugated diene and a material selected from the group consisting of an aromatic vinyl compound, a monoolefinic aliphatic monomer and mixtures thereof.

9. The rubber compound of claim 8, wherein the diene copolymer of component (a) is produced from a material containing from about 5 to about 40 weight percent of an aromatic vinyl compound, and wherein the glass transition point of the diene copolymers of component (a) is between −70° C. and −10° C.

10. The rubber compound of claim 8, wherein the aromatic vinyl compound is selected from the group consisting of styrene, α-methylstyrene, p-methylstyrene, o-methylstyrene, vinylnaphthalene or mixtures thereof.

11. The rubber compound of claim 8, wherein the monoolefinic aliphatic monomer is selected from the group consisting of acrylonitrile, methacrylonitrile and mixtures thereof.

12. The rubber compound of claim 8, wherein the conjugated diene is selected from the group consisting of 1,3-butadiene, 2-methyl-1,3-butadiene, 2,3-dimethyl-1,3-butadiene, 2-chloro-1,3-butadiene, 1,3-pentadiene or mixtures thereof.

13. The rubber compound of claim 1 wherein the reinforcing filler further comprises a material selected from the group consisting of a finely divided, precipitated silica, a finely divided carbon black and mixtures thereof.

14. The rubber compound of claim 1, wherein the layered silicate has a specific BET surface area of about 80 to 220 m$^2$/g, a CTAB surface area of about 80 to 98 m$^2$/g, an average particle diameter of about 0.4 to 10 μm, a pore volume of about 0.1 to 2 mL/g and an SiO$_2$ content of about 80 to 98 percent.

15. The rubber compound of claim 1, wherein the smectitic layered silicate is obtained by treatment of at least one layered silicate with a mineral acid.

16. The rubber compound of claim 1, wherein the acid-activated layered silicate is derived from the smectitic layer silicate by use of an acid mixture containing fluoride ions.

17. The rubber compound of claim 1 wherein the acid-activated layered silicate filler (b) is prepared in a master batch mixture with the coupler (c), wherein the ratio of the acid-activated layer silicate filler (b) to the coupler (c) is from about 0.5 to 1 to about 1.5 to 1.

18. The rubber compound of claim 1, wherein the acid-activated layered silicate comprises from about 20 to 100 percent of the reinforcing filler.

19. The rubber compound of claim 1, wherein the diene polymer or copolymer of component (a) is selected from the group consisting of natural rubber, synthetic polyisoprene, polybutadiene, isoprene-butadiene copolymers and ethylene-propylene diene tertpolymers and mixtures thereof.

20. A rubber compound cross-linked with sulfur, obtained by vulcanization of the rubber compound of claim 1 at a temperature of more than about 100° C.

21. Molded articles produced from the rubber compound of claim 1.

22. The molded articles of claim 21, wherein the molded articles is a vehicle tire.

23. A method for production of a rubber compound comprising mixing a diene polymer or copolymer and a reinforcing filler, comprising an acid-activated layered silicate derived from a smectitic layered silicate, with a coupler material using mixing equipment at a temperature from about 105° C. to 150° C. to form a mixture; and blending sulfur or a sulfur donor as a vulcanization chemical with the mixture at a temperature of less than about 100° C.; wherein the acid-activated layered silicate has a specific BET surface area of about 80 to 250 m$^2$/g, an average particle diameter of about 0.4 to 10 μm, a pore volume of about 0.1 to 2 mL/g and an SiO$_2$ content of about 60 to 98 percent.

24. The method of claim 23, wherein the reinforcing filler is mixed with the coupler using a master batch mixing procedure.

25. The method of claim 23 wherein the smectitic layered silicate is obtained by treatment of at least one layered silicate with a mineral acid.

* * * * *